(12) United States Patent
Zheng et al.

(10) Patent No.: US 9,715,637 B2
(45) Date of Patent: Jul. 25, 2017

(54) METHOD AND SYSTEM FOR AUTOMATIC AORTA SEGMENTATION

(75) Inventors: Yefeng Zheng, Dayton, NJ (US);
Bogdan Georgescu, Plainsboro, NJ (US); Matthias John, Nürnberg (DE);
Jan Boese, Eckental (DE); Dorin Comaniciu, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 2151 days.

(21) Appl. No.: 12/725,679

(22) Filed: Mar. 17, 2010

(65) Prior Publication Data

US 2010/0239148 A1 Sep. 23, 2010

Related U.S. Application Data

(60) Provisional application No. 61/161,139, filed on Mar. 18, 2009.

(51) Int. Cl.
*G06K 9/00* (2006.01)
*G06K 9/46* (2006.01)
*G06T 7/12* (2017.01)

(52) U.S. Cl.
CPC ............. *G06K 9/4638* (2013.01); *G06T 7/12* (2017.01); *G06K 2209/051* (2013.01); *G06T 2200/04* (2013.01); *G06T 2207/10081* (2013.01); *G06T 2207/30101* (2013.01)

(58) Field of Classification Search
CPC .................................................... G06K 9/4638
USPC ........................................................ 382/131
See application file for complete search history.

(56) References Cited

U.S. PATENT DOCUMENTS

| | | |
|---|---|---|
| 2007/0058849 A1 | 3/2007 | Lorenz |
| 2007/0116345 A1* | 5/2007 | Peterson et al. ............... 382/131 |
| 2008/0033302 A1 | 2/2008 | Grady et al. |
| 2008/0101676 A1 | 5/2008 | Zheng et al. |
| 2008/0205722 A1* | 8/2008 | Schaefer et al. ............... 382/128 |
| 2009/0136107 A1 | 5/2009 | Arnold et al. |

* cited by examiner

*Primary Examiner* — Sheetal R Paulson

(57) ABSTRACT

A method and system for aorta segmentation in a 3D volume, such as a C-arm CT volume is disclosed. The aortic root is detected in the 3D volume using marginal space learning (MSL) based segmentation. The aortic arch is detected in the 3D volume using MSL based segmentation. The ascending aorta is tracked from the aortic root to the aortic arch in the 3D volume, and the descending aorta is tracked from the aortic arch in the 3D volume.

29 Claims, 8 Drawing Sheets

(a)  (b)  (c)  (d)

(a)

(b)

METHOD AND SYSTEM FOR AUTOMATIC AORTA SEGMENTATION

This application claims the benefit of U.S. Provisional Application No. 61/161,139, filed Mar. 18, 2009, the disclosure of which is herein incorporated by reference.

BACKGROUND OF THE INVENTION

The present invention relates to medical imaging of the heart, and more particularly, to automatic segmentation of the aorta in 3D medical images, such as C-arm CT volumes.

Aortic valve disease is the most common valvular disease in developed countries, and has the second highest incidence among congenital valvular defects. Implantation of an artificial valve is often necessary to replace a damaged natural valve. Before surgery to replace a damaged valve, several important parameters of the aortic valve need to be extracted for surgery planning. For example, the diameter of the aortic valve annulus needs to be measured accurately in order to select an appropriately sized artificial valve. The distance from the coronary ostia to the sinutubular junction is also an important measure in order to place the artificial valve at an appropriate position to avoid blocking the blood flow to the coronary arteries. During a valve implantation surgery, 2D fluoroscopic images are often captured in real time using a C-arm image acquisition system to provide guidance to the cardiologist. When there is no contrast agent applied, the aortic root cannot be clearly distinguished from the background in the fluoroscopic images. Overlaying a patient-specific aorta model onto the fluoroscopic images during the surgery is often helpful to monitor the relative position of a catheter with respect to the aortic valve.

Computed tomography (CT) is typically used to capture a 3D volume, which is used to perform the necessary 3D measurements and 2D/3D overlay. However, recently, C-arm CT is emerging as a new imaging technique with many advantages as compared to conventional CT. A C-arm CT volume is generated by rotating the X-ray detector of a C-arm image acquisition system. Since both the 3D C-arm CT volume and the 2D fluoroscopic images can be captured on the same device (C-arm system) within a short time interval, overlay of a 3D patient-specific aorta model from a C-arm CT volume on the 2D fluoroscopic images can be easily and accurately implemented. Furthermore, an extracted aortic root resulting from a 3D C-arm CT image can provide the C-arm angulation which will result in the best view of the coronary tree for acquiring the 2D fluoroscopic images.

Although C-arm CT has many advantages over conventional CT with respect to artificial valve implantation surgery, automatic segmentation of the aorta in a C-arm CT volume is a challenging problem. First, the image quality of a C-arm CT volume is typically not as good as a cardiac CT volume due to reconstruction artifacts and a large variation in the use of contrast agent. For example, some C-arm CT volumes may have high contrast, while others have low contrast due to improper timing. A simple intensity-based thresholding technique does not work for volumes having low contrast. Accordingly, such a thresholding technique is not reliable for aorta segmentation in C-arm CT volumes. Second, the scanning protocol for C-arm CT volumes can be quite diverse in the capture range. That is, in different C-arm CT volumes, different portions of the aorta may or may not be present. For example, in some volumes only the ascending aorta is visible, while in other volumes both the ascending and descending aorta are visible. A statistical shape model is often used in object segmentation to enforce a prior shape constraint so that the final segmentation converges to a reasonable shape. Due to the variation in the aorta shape in various C-arm CT volumes, a statistical shape model cannot be applied directly for aorta segmentation.

BRIEF SUMMARY OF THE INVENTION

The present invention provides a method and system for automatic aorta segmentation that can be used to accurately segment the aorta in C-arm CT volumes. Embodiments of the present invention utilize a part-based approach in which the aorta is split into the aortic root, ascending aorta, aortic arch, and descending aorta. This approach is robust to structural variation and to variation of the use of contrast agents in C-arm CT volumes. The aorta segmentation results generated using embodiments of the present invention can be used in aortic valve implantation to provide 3D measurements of the aortic root, to provide the best angulation for a C-arm system for capturing 2D fluoroscopic images, and to overlay the segmented aorta onto the 2D fluoroscopic images to provide guidance during the implantation surgery.

In one embodiment of the present invention, an aortic root is detected in a 3D volume using marginal space learning (MSL). An ascending aorta is tracked from the detected aortic root in the 3D volume. An aortic arch can be detected in the 3D volume using MSL if the aortic arch is present in the 3D volume. If the aortic arch is detected in the 3D volume, the ascending aorta is tracked from the aortic root to the aortic arch, and the descending aorta is tracked from the aortic arch. A segmented aorta is generated based on the detected components of the aorta. The segmented aorta can be refined using a trained boundary detector.

These and other advantages of the invention will be apparent to those of ordinary skill in the art by reference to the following detailed description and the accompanying drawings.

DETAILED DESCRIPTION

The present invention is directed to a method and system for automatic aorta segmentation in medical images, such as C-arm CT volumes. Embodiments of the present invention are described herein to give a visual understanding of the aorta segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Figure 1:
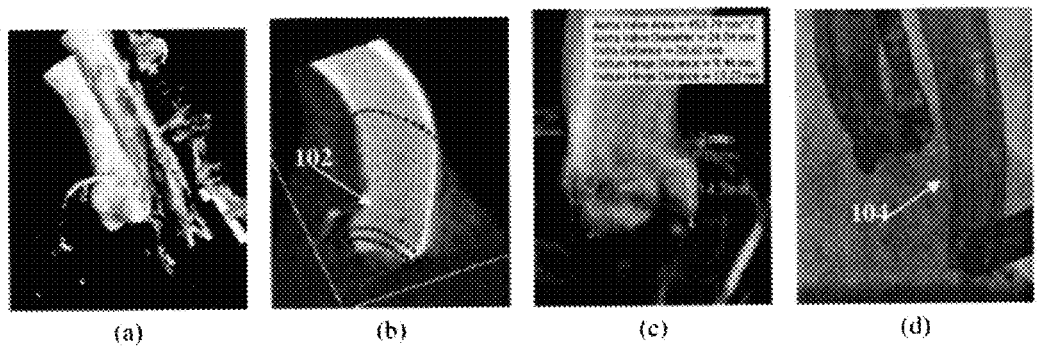
FIG. 1 illustrates the application of aorta segmentation in a C-arm CT volume to aortic valve implantation.

Embodiments of the present invention provide a method for automatic aorta segmentation that can be used to accurately segment the aorta in C-arm CT volumes. This method is robust to structural variation and to variation of the use of contrast agents in C-arm CT volumes. The aorta segmentation results generated using embodiments of the present invention can be used in aortic valve implantation to provide 3D measurements of the aortic root, to provide the best angulation for a C-arm system for capturing 2D fluoroscopic images, and to overlay the segmented aorta onto the 2D fluoroscopic images to provide guidance during the implantation surgery. FIG. 1 illustrates the application of aorta segmentation in a C-arm CT volume to aortic valve implantation. As illustrated in FIG. 1, image (a) is a C-arm CT volume acquired for a patient. Image (b) shows the segmented aortic root 102, which is segmented according to an embodiment of the present invention. Image (c) shows various 3D geometric measurements of the segmented aortic root. Image (d) shows an overlay of the segmented aorta onto a 2D fluoroscopic image for visual guidance during the aortic valve implantation surgery.

Discriminative learning based approaches are efficient and robust for solving many 2D detection problems. In such methods, shape detection and localization is formulated as a classification problem: whether an image block contains the target shape or not. In order to build a robust system, a classifier only tolerates limited variation in object pose. The object is found by scanning the classifier exhaustively over all possible combination of locations, orientations, and scales. This search strategy is different from other parameter estimation approaches, such as deformable models, where an initial estimate is adjusted (e.g., using a gradient descent technique) to optimize a predefined objective function. Exhaustive searching makes the system robust under local minima. However, it is challenging to extend such learning based techniques using exhaustive searching to a high dimensional space because the number of hypotheses increases exponentially with respect to the dimensionality of the parameter space.

Figure 2:
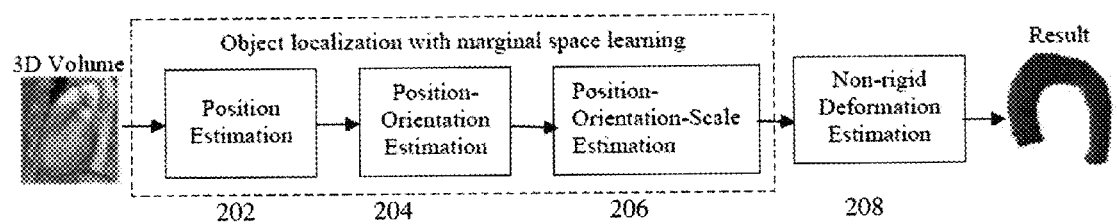
FIG. 2 illustrates 3D object segmentation using MSL according to an embodiment of the present invention.

Recently, marginal space learning (MSL) has been developed to apply learning based techniques for 3D object detection. For example, a method for MSL-based heart chamber segmentation is described in detail in U.S. Patent Application Publication No. 2008/0101676, entitled "System and Method for Segmenting Chambers of a Heart in a Three Dimensional Image", which is incorporated herein by reference. In order to efficiently localize an object using MSL, parameter estimation is performed in a series of marginal spaces with increasing dimensionality. Accordingly, the idea of MSL is not to learn a classifier directly in the full similarity transformation space, but to incrementally learn classifiers in the series of marginal spaces. As the dimensionality increases, the valid space region becomes more restricted by previous marginal space classifiers. FIG. 2 illustrates 3D object segmentation using MSL according to an embodiment of the present invention. The 3D object segmentation can be formulated in two stages: object localization using MSL and boundary delineation. As illustrated in FIG. 2, object localization or detection in an input 3D volume is split into three steps: object position estimation (step 202), position-orientation estimation (step 204), and position-orientation-scale estimation (step 206). A separate classifier is trained based on annotated training data for each of these steps. This object localization stage results in an estimated transformation (position, orientation, and scale) of the object, and a mean shape of the object is aligned with the 3D volume using the estimated transformation. Boundary delineation of the estimated object shape is then performed by non-rigid deformation estimation (step 208). The non-rigid deformation can be performed using a learning based boundary detector and active shape model (ASM). Segmentation using MSL, as described above, has been successfully applied to many 3D object detection problems in medical imaging.

Figure 3:
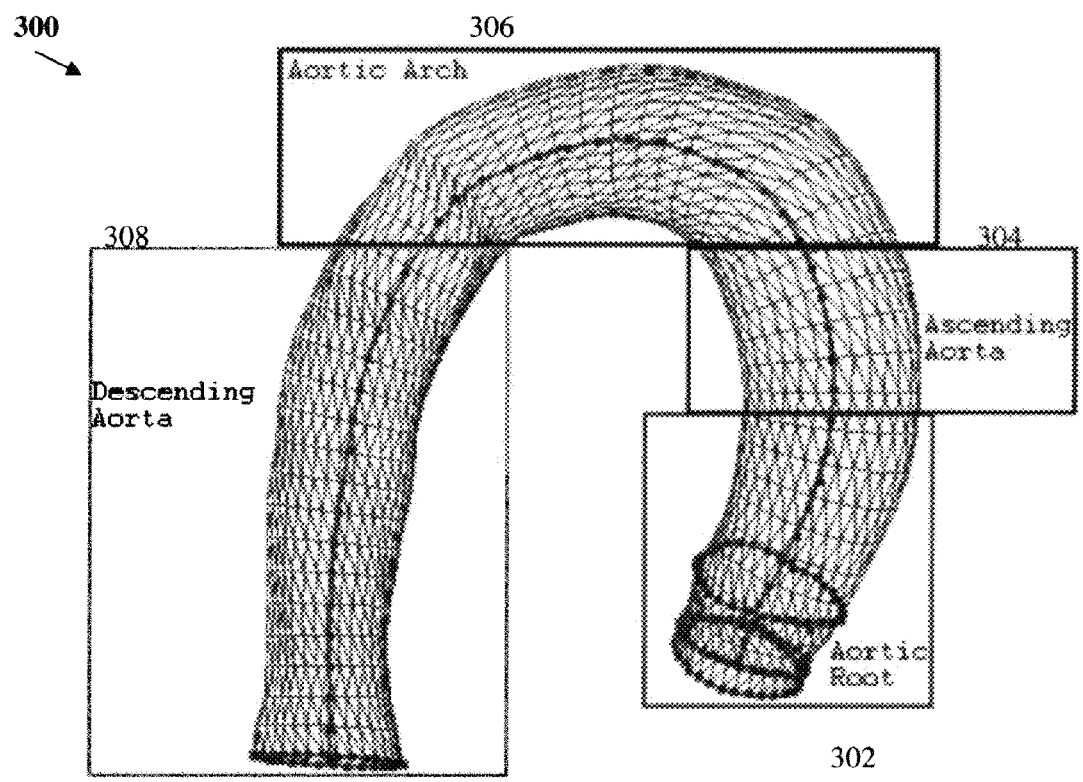
FIG. 3 illustrates a part-based aorta model according to an embodiment of the present invention.

Due to variation in the capture range of C-arm CT volumes, the aorta in a C-arm CT volume does not have a consistent structure. Accordingly, an MSL based approach cannot be applied directly to segment the aorta in a C-arm CT volume. According to an embodiment of the present invention, a part-based aorta detection and segmentation method is used. FIG. 3 illustrates a part-based aorta model 300 according to an embodiment of the present invention. As illustrated in FIG. 3, the part-based aorta model 300 is generated by splitting the whole aorta into four parts: the aortic root 302, the ascending aorta 304, the aortic arch 306, and the descending aorta 308. The aortic root 302 and the aortic arch 306 are consistent in anatomy in different C-arm CT volumes, and therefore, MSL can be used to train detectors for detecting the aortic root 302 and the aortic arch 306. The length of the ascending aorta 304 and descending aorta 308 varies in different C-arm CT images, so a tracking-based method can be used to detect the ascending aorta 304 and descending aorta 308.

Figure 4:
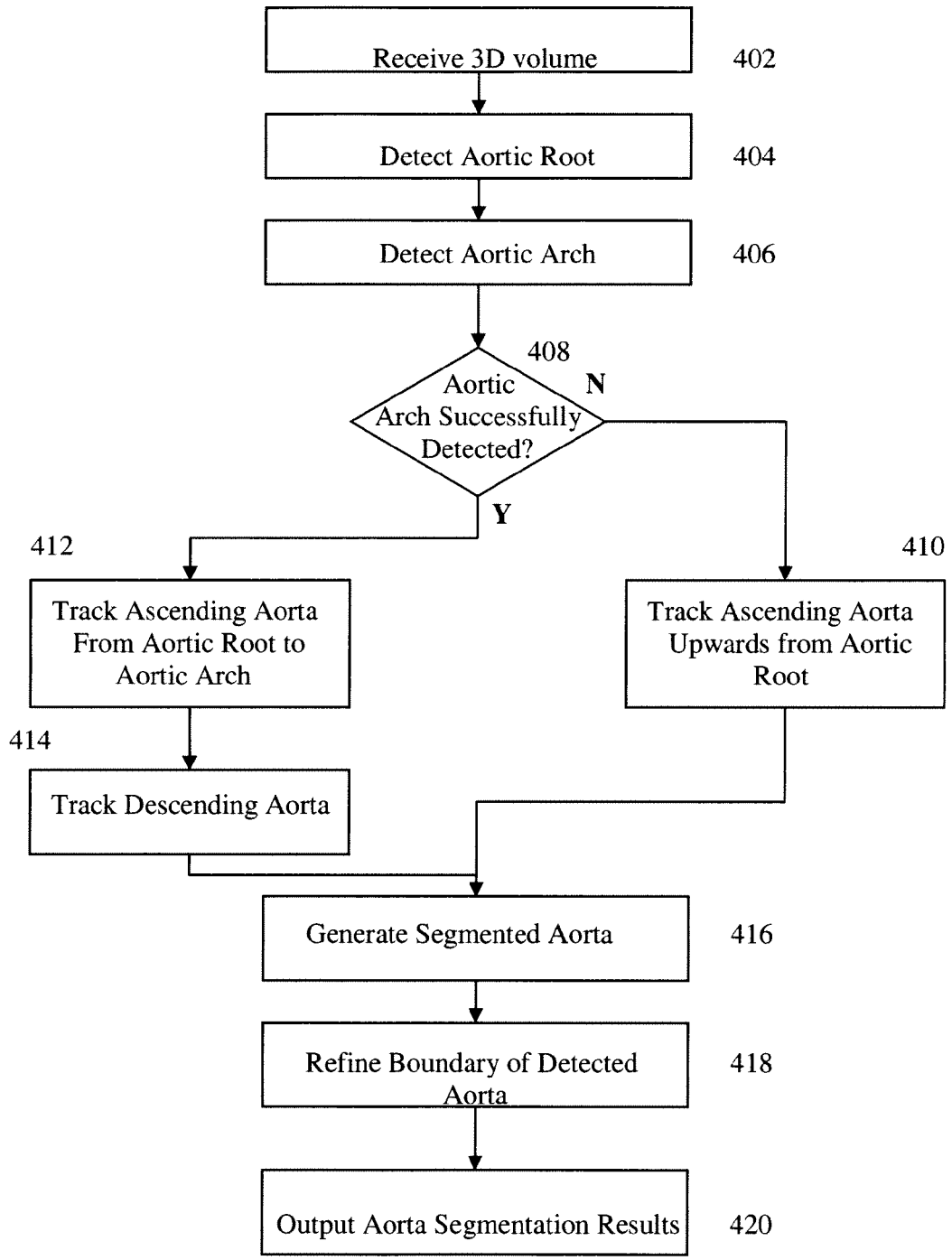
FIG. 4 illustrates a part-based aorta segmentation method according to an embodiment of the present invention.

FIG. 4 illustrates a part-based aorta segmentation method according to an embodiment of the present invention. Referring to FIG. 4, at step 402, a 3D volume is received. According to one embodiment, the 3D volume can be a C-arm CT volume, but the present invention is not limited thereto. It is also possible that the medical volume may be a computed tomography (CT) volume, magnetic resonance imaging (MRI) volume, etc. The 3D volume can be received from an image acquisition device, such as a C-arm image acquisition system, or can be a previously stored volume loaded from memory or storage of a computer system, or some other computer readable medium.

Figure 5:
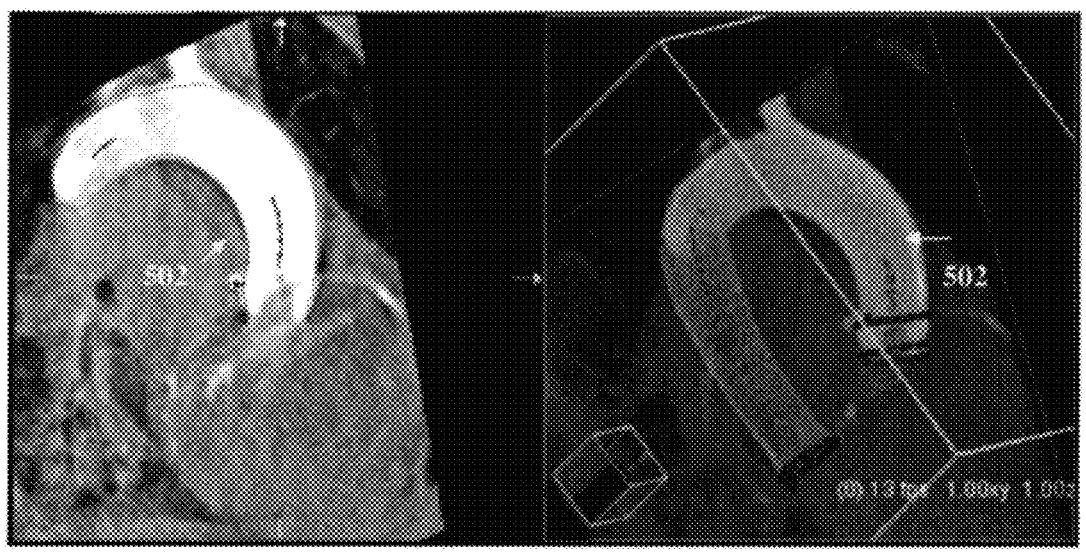
FIG. 5 illustrates the preparation of training samples by truncating the aortic root.
Figure 5:
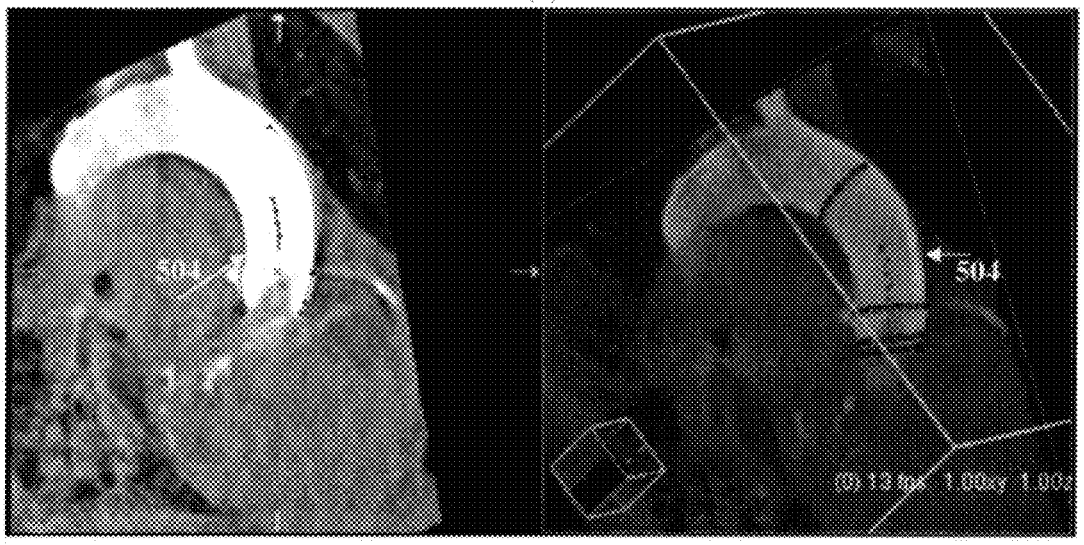

At step 404, the aortic root is detected in the 3D volume. The aortic root is detected using MSL. As described above, and illustrated in FIG. 2, in MSL-based segmentation, after estimating the pose (position, orientation, and scale) of an object, the mean shape of the object is aligned with the estimated pose as an initial estimate of the object shape. Although the aortic root is always present in cardiac C-arm CT volumes, the length of the aortic root may vary significantly. Due to this structure variation, it is difficult to calculate a reliable mean shape for the aortic root in annotated training data. Accordingly, according to an embodiment of the present invention, in order to train the MSL classifiers for detecting the aortic root, the shortest aortic root that is consistent in length across all of the training volumes is indentified, and the aortic roots of the training volumes are truncated to match the shortest aortic root. FIG. 5 illustrates the preparation of training samples by truncating the aortic root. As illustrated in FIG. 5, row (a) shows the whole aorta 502 annotated in a slice of a 3D image volume and a 3D mesh representation. Row (b) shows the common portion of the aortic root 504 truncated based on the shortest aortic root in a set of training data in the slice and 3D mesh representation.

Figure 6:
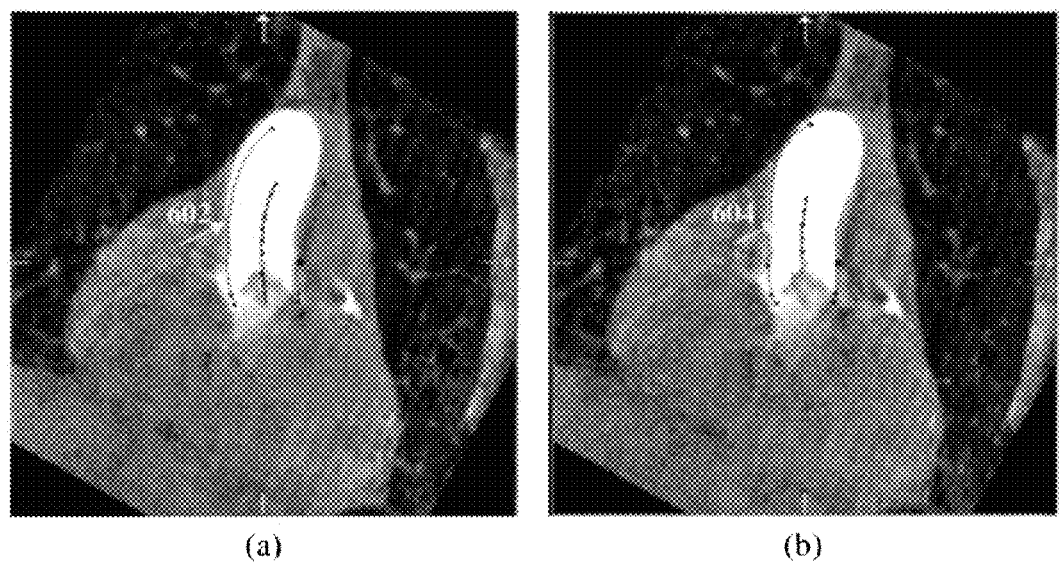
FIG. 6 illustrates detection and segmentation results of the aortic root using MSL.

After truncating the aortic roots of the training data, the aortic roots are consistent in anatomy and MSL can be applied to train classifiers to detect and segment the aortic root. In particular, the mean shape of the truncated aortic roots in the training data is aligned with the estimated posed determined using the MSL classifiers. As described above and illustrated in FIG. 2, after the initial estimate for the pose of the aortic root is detected a learning based boundary model and active shape model can be used to for final boundary delineation of the aortic root. FIG. 6 illustrates detection and segmentation results of the aortic root using MSL. As illustrated in FIG. 6, image (a) shows initial aortic root detection results 602 achieved by aligning the mean shape with the pose estimated using the MSL classifiers. Image (b) shows the final aortic root segmentation result 604 after using the learning based boundary detector and active shape model.

Returning to FIG. 4, at step 406, the aortic arch is detected in the 3D volume. The aortic arch is detected using MSL. The aortic arch may be present in some volumes, but missing in other volumes. Accordingly, it is to be understood that the step of "detecting" aortic arch in step 406 refers to attempting to detect the aortic arch that may result in successful arch detection or no arch being detected. Furthermore, the structure of the aortic arch can vary in volumes that contain the aortic arch. This structural variation is handled similarly to the aortic root. In particular, a consistent portion of the aortic arch must be extracted in all training volumes containing the aortic arch. An MSL-based aortic arch detector (including position, position-orientation, and position-orientation-scale classifiers) is then trained based on the training data, and the aortic arch is detected in the 3D volume using MSL segmentation, as described above and illustrated in FIG. 2.

Because the aortic arch is not always present in C-arm CT volumes, the aortic arch detection of step 406 may result in a determination that no aortic arch is present in the 3D volume. At step 408, it is determined if the aortic arch is successfully detected in the 3D volume in step 406. If no aortic arch is detected in the 3D volume, the method proceeds to step 410. If the aortic arch is detected in the 3D volume, the method proceeds to step 412.

At steps 410 and 412, the ascending aorta is tracked from the aortic root in the 3D volume. The length of the visible ascending and descending aorta varies significantly form volume to volume. Instead of truncating them to the same length, embodiments of the present invention utilize a tracking method to deal with this variation. In a C-arm CT volume, the orientation of the ascending and descending aorta (after excluding the root and the arch) aligns quite well with the normal of the imaging plane. This means that on an image slice, the intersection of the ascending and descending aorta is in the approximate shape of a circle. According to an embodiment of the present invention, a 2D circle detector is trained based on annotated training data to detect the circular intersection of the ascending and descending aorta with a 2D slice. According to an advantageous implementation, the 2D circle detector can be trained using Haar wavelet features. The tracking of the ascending aorta starts from the aortic root and is performed slice by slice, moving upwards towards a patient's head. For each slice, the trained circle detector is used to attempt to detect an aortic circle on that slice. For an imaging slice containing the ascending aorta, the 2D circle detector may fire up multiple times around the true position of the aortic circle. The detected circle that is closest to the circle detected on the previous slice is selected, and the tracking method moves to the next slice. It is to be understood that the initial circle on the initial slice corresponds to an uppermost portion of the aortic root. At step 410, if the aortic arch is not successfully detected in the 3D volume, the ascending aorta is tracked upwards from the aortic root and the tracking procedure stops when it reaches the top border of the volume or when no aortic circle is detected in a slice. In this case, no descending aorta is tracked in the 3D volume and the method proceeds to step 416. At step 412, if the aortic arch is successfully detected in the 3D volume, the ascending aorta is tracked from the aortic root and the tracking procedure stops on a slice touching the aortic arch. In this case, the method then proceeds to step 414 for tracking of the descending aorta.

At step 414, the descending aorta is tracked. The tracking of the descending aorta is similar to the tracking of the ascending aorta. The tracking of the descending aorta starts from the aortic arch and is performed slice by slice, moving downwards towards a patient's feet. For each slice, the trained circle detector is used to attempt to detect an aortic circle on that slice, and the detected circle that is closest to the circle detected on the previous slice is selected. The descending aorta tracking method stops when no aortic circle is detected in a slice.

At step 416, a segmented aorta is generated based on the detected aorta parts. The tracking steps result in the centerline of the ascending and descending aorta. A tube is synthesized as an initial estimate of the shape for each of the ascending and descending aorta. The radius of the tube can be set as the mean radius of the aorta calculated from the training volumes. Since the tracking steps track the ascending aorta from the aortic root to the aortic arch and the descending aorta from the aortic arch, all of the detected aorta parts are connected in a segmented aorta model. It is to be understood that when the aortic arch is not present in a volume, the segmented aorta model will include only the aortic root and ascending aorta.

Figure 7:
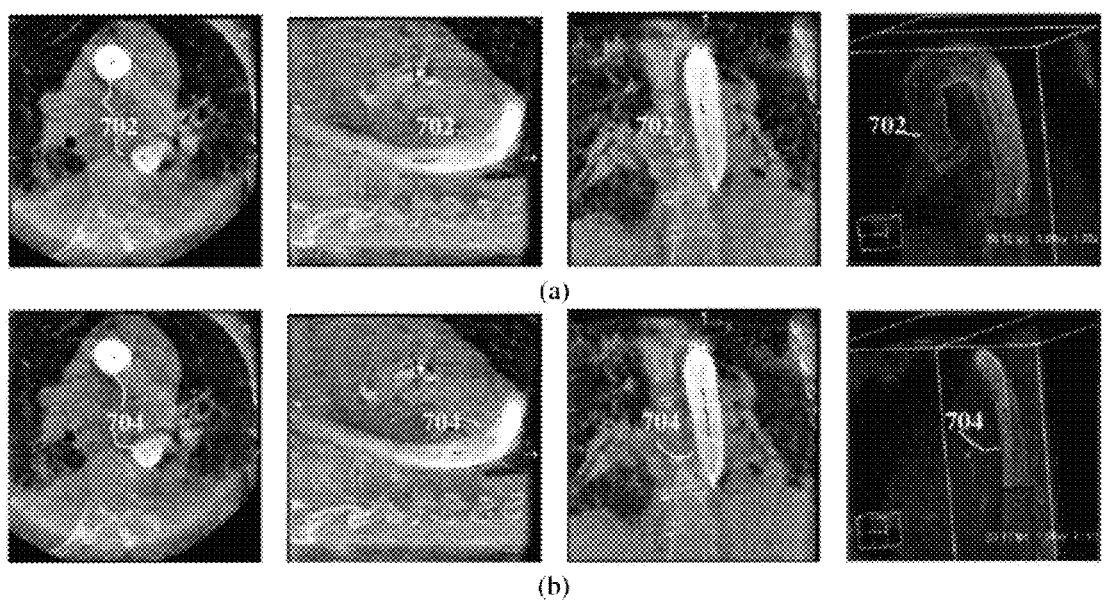
FIG. 7 illustrates aorta segmentation results prior to and after boundary refinement.

At step 418, the boundary of the detected aorta is refined. The initial estimate of the aorta shape achieved from the tracking steps is close to the true aorta boundary; however, a perfect circle likely does not fit the boundary exactly. A learning based boundary detector is trained based on training data and used for final boundary delineation. One difference with respect to the boundary delineation of the aortic root or the aortic arch is that an active shape model cannot be used to enforce a priori shape constraint since the whole aorta is not consistent in structure. Instead, a generic mesh smoothing technique can be used to achieve a smooth surface for the segmented aorta. Accordingly, a two-step iterative approach can be used for boundary refinement. First, the learning-based boundary detector is used to adjust each mesh point along the surface normal to the optimal position where the response of the boundary detector is largest. Second, a mesh smoothing technique is used to smooth the resulting boundary. These two steps can be iterated to improve the boundary delineation accuracy. FIG. 7 illustrates aorta segmentation results prior to and after boundary refinement. As illustrate in FIG. 7, row (a) shows aorta segmentation results 702 after tracking the ascending and descending aorta in three orthogonal views of a volume and the corresponding 3D mesh. Row (b) shows aorta segmentation results 704 after boundary refinement in three orthogonal views of a volume and the corresponding 3D mesh.

At step 420, the aorta segmentation results are output. For example, the aorta segmentation results can be output by displaying the aorta segmentation results on a display of a computer system, or other display device. It is also possible that the aorta segmentation results can be output by storing the segmented aorta, for example, on a storage or memory of a computer system or on a computer readable medium. The output aorta segmentation results can also be used for aortic valve implantation, for example, to provide 3D measurements of the aortic root for surgery planning, to provide an optimal angulation for a C-arm system to acquire 2D fluoroscopic images, and to overlay the extracted aorta onto 2D fluoroscopic images to provide guidance during aortic valve implantation surgery.

Figure 8:
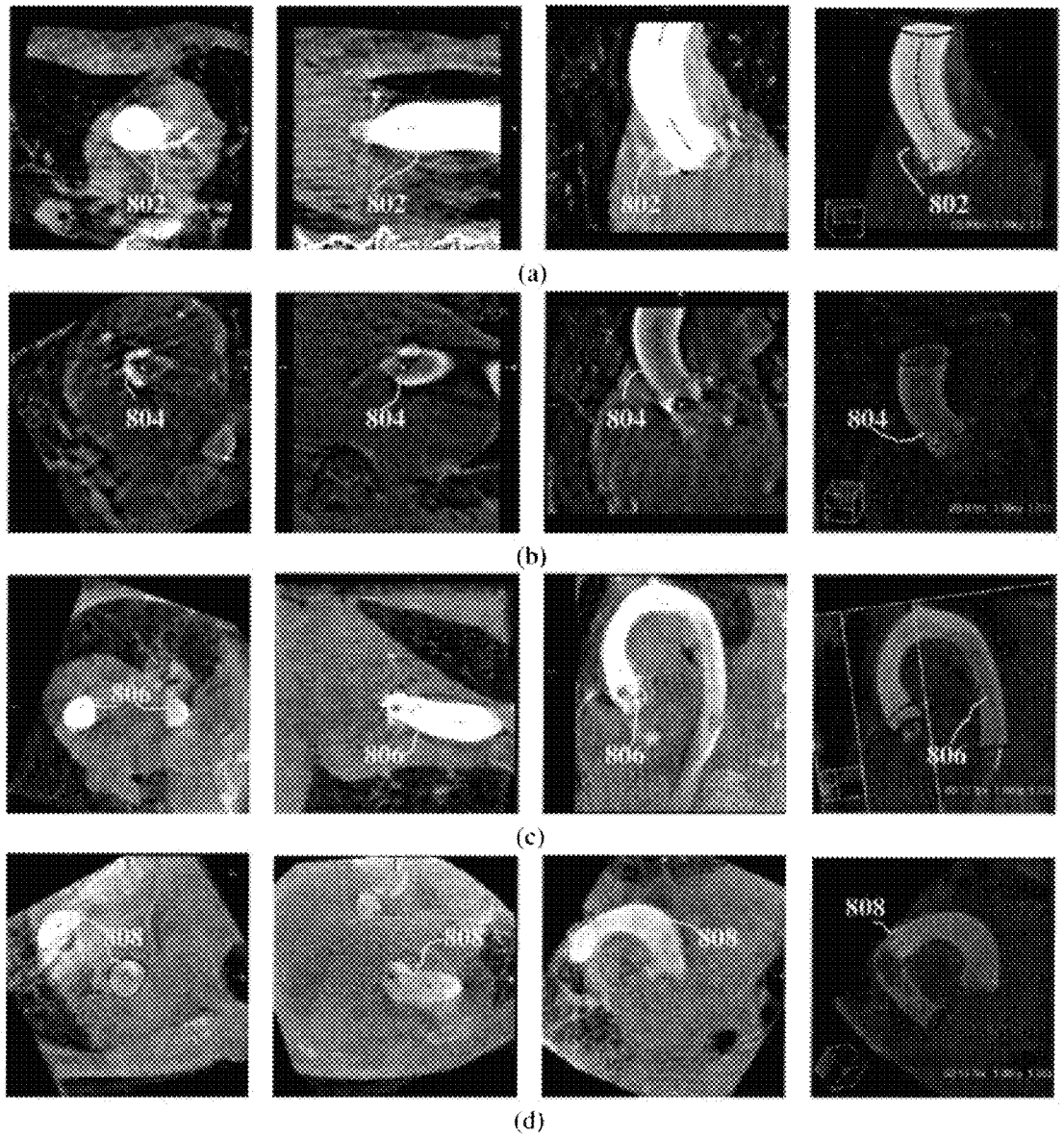
FIG. 8 illustrates exemplary aorta segmentation results.

FIG. 8 illustrates exemplary aorta segmentation results detected using the method of FIG. 4. As illustrated in FIG. 8, each of rows (a)-(d) shows aorta segmentation on three orthogonal views of a 3D volume and the corresponding 3D mesh. Row (a) shows aorta segmentation results 802 in a high contrast volume with only the ascending aorta captured. Row (b) shows aorta segmentation results 804 in a low contrast volume with only the ascending aorta captured. Row (c) shows aorta segmentation results 806 in a high contrast volume with both the ascending aorta and the descending aorta captured. Row (d) shows aorta segmentation results 808 in a low contrast volume with both the ascending aorta and the descending aorta captured.

Figure 9:
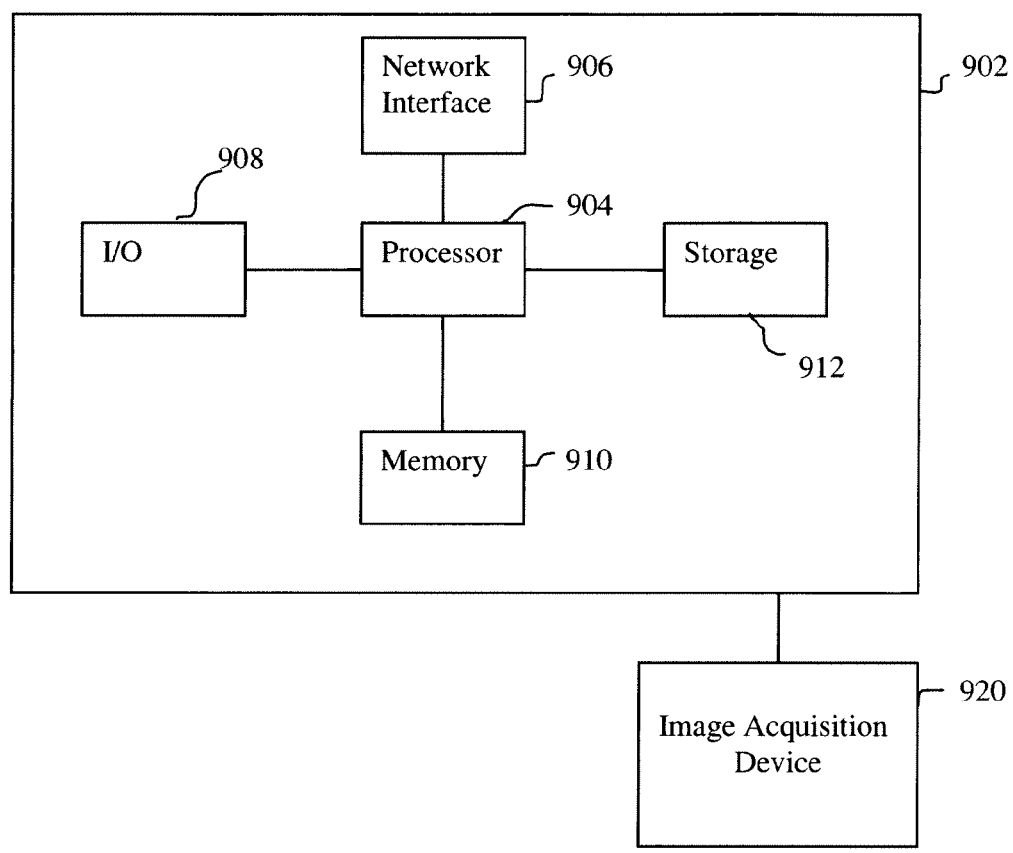
FIG. 9 is a high level block diagram of a computer capable of implementing the present invention.

The above-described methods for aorta segmentation in a 3D volume, such as a C-arm CT volume, may be implemented on a computer using well-known computer processors, memory units, storage devices, computer software, and other components. A high level block diagram of such a computer is illustrated in FIG. 9. Computer 902 contains a processor 904 which controls the overall operation of the computer 902 by executing computer program instructions which define such operation. The computer program instructions may be stored in a storage device 912, or other computer readable medium (e.g., magnetic disk, CD ROM, etc.) and loaded into memory 910 when execution of the computer program instructions is desired. Thus, the steps of the methods of FIGS. 2 and 4 may be defined by the computer program instructions stored in the memory 910 and/or storage 912 and controlled by the processor 904 executing the computer program instructions. An image acquisition device 920 can be connected to the computer 902 to input images to the computer 902. For example the image acquisition device 920 may be a C-arm image acquisition system capable of inputting 3D C-arm CT images and 2D fluoroscopic images to the computer 902. It is possible to implement the image acquisition device 920 and the computer 902 as one device. It is also possible that the image acquisition device 920 and the computer 902 communicate wirelessly through a network. The computer 902 also includes one or more network interfaces 906 for communicating with other devices via a network. The computer 902 also includes other input/output devices 908 that enable user interaction with the computer 902 (e.g., display, keyboard, mouse, speakers, buttons, etc.). One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for aorta segmentation in a 3D volume, comprising:
   detecting an aortic root in the 3D volume using marginal space learning (MSL); and
   tracking an ascending aorta from the detected aortic root in the 3D volume; and
   generating a segmented aorta including the detected aortic root and the ascending aorta.

2. The method of claim 1, wherein the 3d volume is a C-arm CT volume.

3. The method of claim 1, wherein said step of detecting an aortic root in the 3D volume using marginal space learning (MSL) comprises:
   detecting a position, orientation, and scale of the aortic root in the 3D volume using a trained position classifier, a trained position-orientation classifier, and a trained position-orientation-scale classifier;
   aligning a mean truncated aortic root estimated from a set of training volumes to the detected position, orientation, and scale in the 3D volume to generate an initial detection result for the aortic root; and
   refining a boundary of the initial detection result for the aortic root using a trained boundary classifier.

4. The method of claim 3, wherein the mean truncated aortic root is estimated by identifying a portion of the aortic root that is common to all of the training volumes, and truncating an annotated aortic root in each of the training volumes to match the portion of the aortic root that is common to all training volumes.

5. The method of claim 1, wherein said step of tracking an ascending aorta from the detected aortic root in the 3D volume comprises:
   detecting, on a slice by slice basis starting at the aortic root and moving upward in the 3D volume, an aortic circle representing an intersection of the ascending aorta and a current slice using a trained 2D circle detector.

6. The method of claim 1, further comprising:
   detecting an aortic arch in the 3D volume using MSL.

7. The method of claim 6, wherein said step of tracking an ascending aorta from the detected aortic root in the 3D volume comprises:
   tracking the ascending aorta from the detected aortic root to the detected aortic arch.

8. The method of claim 7, further comprising:
   tracking a descending aorta from the detected aortic arch, wherein the segmented aorta includes the aortic root, the ascending aorta, the aortic arch, and the descending aorta.

9. The method of claim 8, wherein said step of tracking a descending aorta from the detected aortic arch comprises:
   detecting, on a slice by slice basis starting at the aortic arch and moving downward in the 3D volume, an aortic circle representing an intersection of the descending aorta and a current slice using a trained 2D circle detector; and
   stopping said tracking at a slice in which no aortic circle is detected by the 2D circle detector.

10. The method of claim 6, wherein said step of detecting an aortic arch in the 3D volume using MSL comprises:
  detecting a position, orientation, and scale of the aortic arch in the 3D volume using a trained position classifier, a trained position-orientation classifier, and a trained position-orientation-scale classifier;
  aligning a mean truncated aortic arch estimated from a set of training volumes to the detected position, orientation, and scale in the 3D volume to generate an initial detection result for the aortic arch; and
  refining a boundary of the initial detection result for the aortic arch using a trained boundary classifier.

11. The method of claim 10, wherein the mean truncated aortic arch is estimated by identifying portion of the aortic arch that is common to all of the training volumes, and truncating an annotated aortic arch in each of the training volumes to match the portion of the aortic arch that is common to all training volumes.

12. The method of claim 1, further comprising determining that no aortic arch is present in the 3D volume, wherein said step of tracking an ascending aorta from the detected aortic root in the 3D volume comprises:
  detecting, on a slice by slice basis starting at the aortic root and moving upward in the 3D volume, an aortic circle representing an intersection of the ascending aorta and a current slice using a trained 2D circle detector; and
  stopping said tracking at one of a slice in which no aortic circle is detected by the 2D circle detector and a top border of the 3D volume.

13. The method of claim 1, further comprising:
  refining a boundary of the segmented aorta using trained boundary detector to adjust each point on the boundary of the segmented aorta.

14. The method of claim 13, further comprising:
  smoothing the refined boundary of the segmented aorta.

15. A method for aorta segmentation in a 3D volume, comprising:
  detecting an aortic root in the 3D volume using marginal space learning (MSL);
  detecting an aortic arch in the 3D volume using MSL if the aortic arch is present in the 3D volume;
  if the aortic arch is not detected in the 3D volume:
    tracking an ascending aorta upward from the detected aortic root in the 3D volume;
  if the aortic arch is detected in the 3D volume:
    tracking the ascending aorta from the detected aortic root to the detected aortic arch in the 3D volume, and
    tracking a descending aorta from the detected aortic arch in the 3D volume.

16. An apparatus for aorta segmentation in a 3D volume, comprising:
  means for detecting an aortic root in the 3D volume using marginal space learning (MSL); and
  means for tracking an ascending aorta from the detected aortic root in the 3D volume; and
  means for generating a segmented aorta including the detected aortic root and the ascending aorta.

17. The apparatus of claim 16, wherein said means for tracking an ascending aorta from the detected aortic root in the 3D volume comprises:
  means for detecting, on a slice by slice basis starting at the aortic root and moving upward in the 3D volume, an aortic circle representing an intersection of the ascending aorta and a current slice using a trained 2D circle detector.

18. The apparatus of claim 16, further comprising:
  means for detecting an aortic arch in the 3D volume using MSL; and
  means for tracking a descending aorta from the detected aortic arch, wherein the segmented aorta includes the aortic root, the ascending aorta, the aortic arch, and the descending aorta.

19. The apparatus of claim 18, wherein said means for tracking an ascending aorta from the detected aortic root in the 3D volume comprises:
  means for tracking the ascending aorta from the detected aortic root to the detected aortic arch.

20. The apparatus of claim 19, wherein said means for tracking a descending aorta from the detected aortic arch comprises:
  means for detecting, on a slice by slice basis starting at the aortic arch and moving downward in the 3D volume, an aortic circle representing an intersection of the descending aorta and a current slice using a trained 2D circle detector; and
  means for stopping said tracking at a slice in which no aortic circle is detected by the 2D circle detector.

21. The apparatus of claim 16, further comprising:
  means for determining that no aortic arch is present in the 3D volume;
  wherein said step of tracking an ascending aorta from the detected aortic root in the 3D volume comprises:
    means for detecting, on a slice by slice basis starting at the aortic root and moving upward in the 3D volume, an aortic circle representing an intersection of the ascending aorta and a current slice using a trained 2D circle detector; and
    means for stopping said tracking at one of a slice in which no aortic circle is detected by the 2D circle detector and a top border of the 3D volume.

22. The apparatus of claim 16, further comprising:
  means for refining a boundary of the segmented aorta using trained boundary detector to adjust each point on the boundary of the segmented aorta.

23. A non-transitory computer readable medium encoded with computer executable instructions for aorta segmentation in a 3D volume, the computer executable instructions defining steps comprising:
  detecting an aortic root in the 3D volume using marginal space learning (MSL); and
  tracking an ascending aorta from the detected aortic root in the 3D volume; and
  generating a segmented aorta including the detected aortic root and the ascending aorta.

24. The computer readable medium of claim 23, wherein the computer executable instructions defining the step of tracking an ascending aorta from the detected aortic root in the 3D volume comprise computer executable instructions defining the step of:
  detecting, on a slice by slice basis starting at the aortic root and moving upward in the 3D volume, an aortic circle representing an intersection of the ascending aorta and a current slice using a trained 2D circle detector.

25. The computer readable medium of claim 24, further comprising computer executable instructions defining the steps of:
  detecting an aortic arch in the 3D volume using MSL; and
  tracking a descending aorta from the detected aortic arch, wherein the segmented aorta includes the aortic root, the ascending aorta, the aortic arch, and the descending aorta.

26. The computer readable medium of claim 25, wherein the computer executable instructions defining the step of tracking an ascending aorta from the detected aortic root in the 3D volume comprise computer executable instructions defining the step of:
  tracking the ascending aorta from the detected aortic root to the detected aortic arch.

27. The computer readable medium of claim 26, wherein the computer executable instructions defining the step of tracking a descending aorta from the detected aortic arch comprise computer executable instructions defining the steps of:
  detecting, on a slice by slice basis starting at the aortic arch and moving downward in the 3D volume, an aortic circle representing an intersection of the descending aorta and a current slice using a trained 2D circle detector; and
  stopping said tracking at a slice in which no aortic circle is detected by the 2D circle detector.

28. The computer readable medium of claim 23, further comprising computer executable instructions defining the step of:
  determining that no aortic arch is present in the 3D volume;
  wherein the computer executable instructions defining the step of tracking an ascending aorta from the detected aortic root in the 3D volume comprise computer executable instructions defining the steps of:
    detecting, on a slice by slice basis starting at the aortic root and moving upward in the 3D volume, an aortic circle representing an intersection of the ascending aorta and a current slice using a trained 2D circle detector; and
    stopping said tracking at one of a slice in which no aortic circle is detected by the 2D circle detector and a top border of the 3D volume.

29. The computer readable medium of claim 23, further comprising computer executable instructions defining the steps of:
  refining a boundary of the segmented aorta using trained boundary detector to adjust each point on the boundary of the segmented aorta.

* * * * *